United States Patent [19]
Wischer-Mann

[11] Patent Number: 6,094,231
[45] Date of Patent: *Jul. 25, 2000

[54] METHOD OF AND CIRCUIT FOR REMOVING NOISE SIGNALS FROM VIDEO SIGNALS

[75] Inventor: Gerhard Wischer-Mann, Weiterstadt, Germany

[73] Assignee: U.S. Philips Corporation, New York, N.Y.

[ * ] Notice: This patent is subject to a terminal disclaimer.

[21] Appl. No.: 08/356,948

[22] Filed: Dec. 15, 1994

[30] Foreign Application Priority Data

Dec. 17, 1993 [DE] Germany ............................. 43 43 095

[51] Int. Cl.$^7$ .................................................. H04N 5/213

[52] U.S. Cl. .......................................... 348/607; 348/620

[58] Field of Search ................................... 348/607, 608, 348/612, 618, 620, 624, 683, 701, 909; 382/262, 275; H04N 5/21, 5/213

[56] References Cited

U.S. PATENT DOCUMENTS

| | | | |
|---|---|---|---|
| 5,404,178 | 4/1995 | Kondo | 348/618 |
| 5,485,222 | 1/1996 | Wischermann | 348/607 |
| 5,519,453 | 5/1996 | Wischermann | 348/620 |
| 5,543,858 | 8/1996 | Wischermann | 348/618 |

FOREIGN PATENT DOCUMENTS

| | | | |
|---|---|---|---|
| 4014981A1 | 11/1991 | Germany | H04N 5/21 |
| 4326390 | 8/1993 | Germany . | |
| 2246265 | 1/1992 | United Kingdom | H04N 5/217 |

*Primary Examiner*—Sherrie Hsia
*Attorney, Agent, or Firm*—Edward W. Goodman

[57] ABSTRACT

A method of and a circuit for removing noise signals from video signals by adaptive median filtering which masks errors in large-size disturbed picture areas caused by dirt and dust during scanning of the film. In this method, the picture content is always classified in stationary, moving, undisturbed and disturbed picture areas. Subsequent thereto, error masking is only effected by temporal median filtering in only the disturbed, stationary picture area.

10 Claims, 7 Drawing Sheets

METHOD OF AND CIRCUIT FOR REMOVING NOISE SIGNALS FROM VIDEO SIGNALS

BACKGROUND OF THE INVENTION

1. Field of the Invention

The invention relates to a method and a circuit for removing noise signals from video signals by means of adaptive median filtering.

2. Description of the Related Art

German Patent Application P 43 26 390.9, corresponding to U.S. Pat. No. 5,519,453 (Atty. docket PHD 93-105), proposes a method of removing noise signals from video signals by means of a motion adaptive filtering, in which uniformly distributed noise as well as also pulse noise must be eliminated.

In addition, German Patent DE 40 14 971 A1, corresponding to U.K. Patent GB 2,246,265 (PHD 90-246 GB), discloses a circuit arrangement for median filtering of video signals produced during scanning of a film, by means of which, interferences due to dust and scratches must be reduced.

Characteristic of the interferences and of the efficiency of the method described is a limited local expansion of the interference to a few related picture elements, to one line at a maximum.

SUMMARY OF THE INVENTION

The present invention has therefore for its object to provide a method and a circuit for removing noise signals from video signals, enabling the masking of errors of very large-sized disturbed picture areas, for example, due to excessively stained or highly scratched films.

This object is accomplished in that the picture content is always classified into stationary, moving, undisturbed and disturbed picture areas and that contiguous thereto, error masking, by means of temporal median filtering, is only effected in the disturbed and stationary picture areas.

The method according to the invention has the advantage that large-sized interferences in stationary picture areas of films can optimally be suppressed without large extra costs or design efforts.

BRIEF DESCRIPTION OF THE DRAWINGS

An embodiment of the invention is shown in the drawings and described in greater detail in the following description. In the drawings.

Corresponding components in the Figures have been given the same references.

DESCRIPTION OF THE PREFERRED EMBODIMENTS

Figure 1:
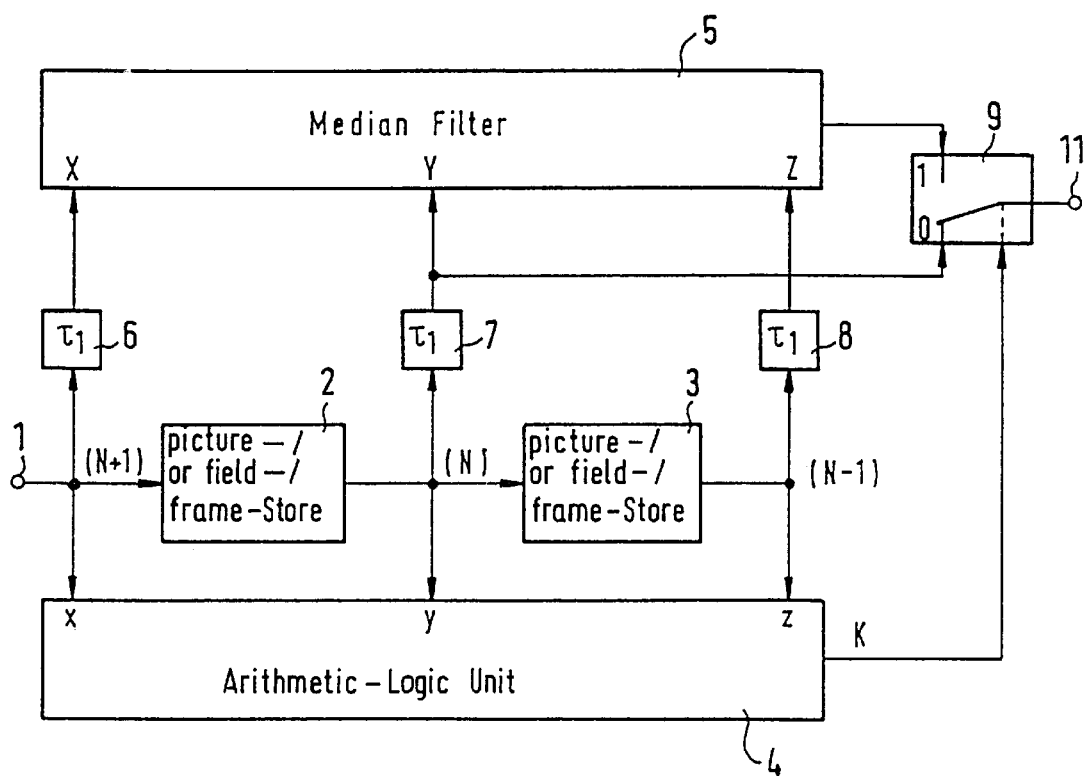
FIG. 1 is a block circuit diagram for putting the method of the invention into effect.

In the block circuit diagram shown in FIG. 1 for putting the method in accordance with the invention into effect, a digital video signal (luminance and/or chrominance signal) which is preferably derived during film scan, is applied via a terminal 1 to two series-arranged (frame or field) picture stores 2, 3, so that three consecutive pictures N−1, N, N+1 are simultaneously available. The video signals x, y, z of these three pictures are now applied, on the one hand, to the inputs X, Y, Z of an arithmetic-logic unit 4 for producing a control signal K, and, on the other hand, to the inputs X, Y, Z of a median filter 5, each via a delay section 6, 7, 8 for propagation time matching to the control signal K. If the picture at the input Y is considered to be the actual picture N, then the preceding picture N−1, at the input Z, and the subsequent picture N+1, at the input X, are available.

The output of the median filter 5 is connected to one input of a change-over switch 9, at whose other input the video signal Y of the picture N is present. The change-over switch 9 is switched by means of the control or switching signal K, which is produced in the arithmetic-logic unit 4 and is available at its output. In the arithmetic-logic unit 4, a classification of the picture content of the three simultaneously available pictures in moving, stationary, disturbed and undisturbed picture areas is performed and a switching signal K is only produced for the disturbed and stationary picture areas. Thereby the switch 9 is switched in such a manner that in only the disturbed and stationary areas of the picture N the output signal of the median filter 5 arrives at the output 11, while, for all the other picture areas, the signal Y of the picture N is directly conveyed to the output 11. It is of course a condition for the function of error masking by the median filter 5 that the neighboring pictures N−1 and N+1 are in this position free from errors.

The classification of the picture content for deriving the control signal K will now be described with reference to FIG. 2. Let the picture content be characterized by the objects A, B and C. Object A comprises all the quiescent picture details, object B represents a disturbed picture area, which only occurs in picture N, and object C defines a picture portion moving from left to right.

In order to establish the differences between the pictures, the differences in the video signals y−x and y−z are computed. The amount of the differences is considered in German Patent Application P 43 26 390.9, corresponding to U.S. Pat. No. 5,519,453 (Atty. docket PHD 93-105), to be a motion signal and is used for controlling (switching off) the median filter, so as to prevent motional streaking. It then happens that the object B, i.e., the interference in the picture N, is also mis-interpreted as motion and that the median filter would be switched off.

It is however the object of the method according to the invention to energize the median filtering operation precisely in this case. Therefore, a criterium to distinguish between object B (interference) and C (motion) is searched for. A feature of the interference is that the object B occurs non-recurrently in the picture N. This has for its result that in the picture N, it holds for the two differential signals y−x and y−z that: y−=y−z or x=z, respectively. This can be interpreted as follows: when a non-recurrent interference occurs in the picture N, the two motion detectors respond to the same extent, and there is no difference between picture N−1 and picture N+1, that is to say x−z=0.

Figure 3A:
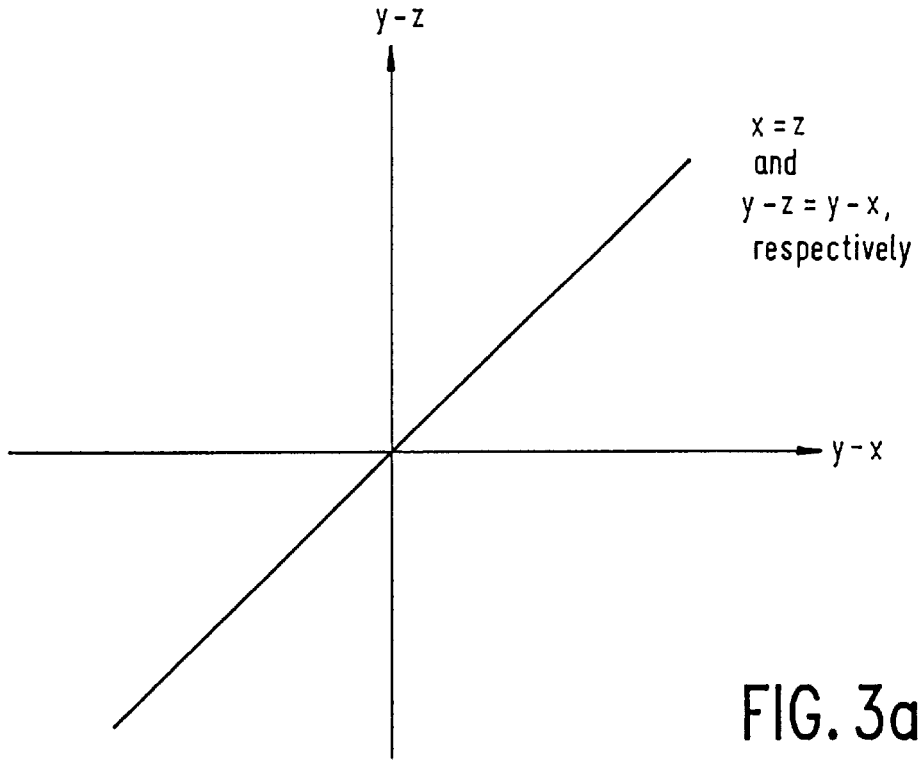
FIGS. 3a and 3b are graphical representations of the picture interferences in a system of coordinates.

FIG. 3a illustrates this fact graphically. All the singular picture interferences are located on a 45°-straight line in a system of coordinates, at which y−z is plotted on y−x. Since always a certain noise component is superimposed on real picture signals, the difference between the pictures N−1 and N+1 will not be accurately equal to zero. It is therefore convenient, to define, instead of the strict straight scratch line, a tolerance area by |x−z|<S1. The threshold value S1 is determined by the peak value of the noise amplitude to be expected and can be set from the exterior or automatically, as is, for example, described in German Patent Application P 43 19 343.9, corresponding to U.S. Pat. No. 5,485,222 (Atty. docket PHD 93-083).

Figure 3B:
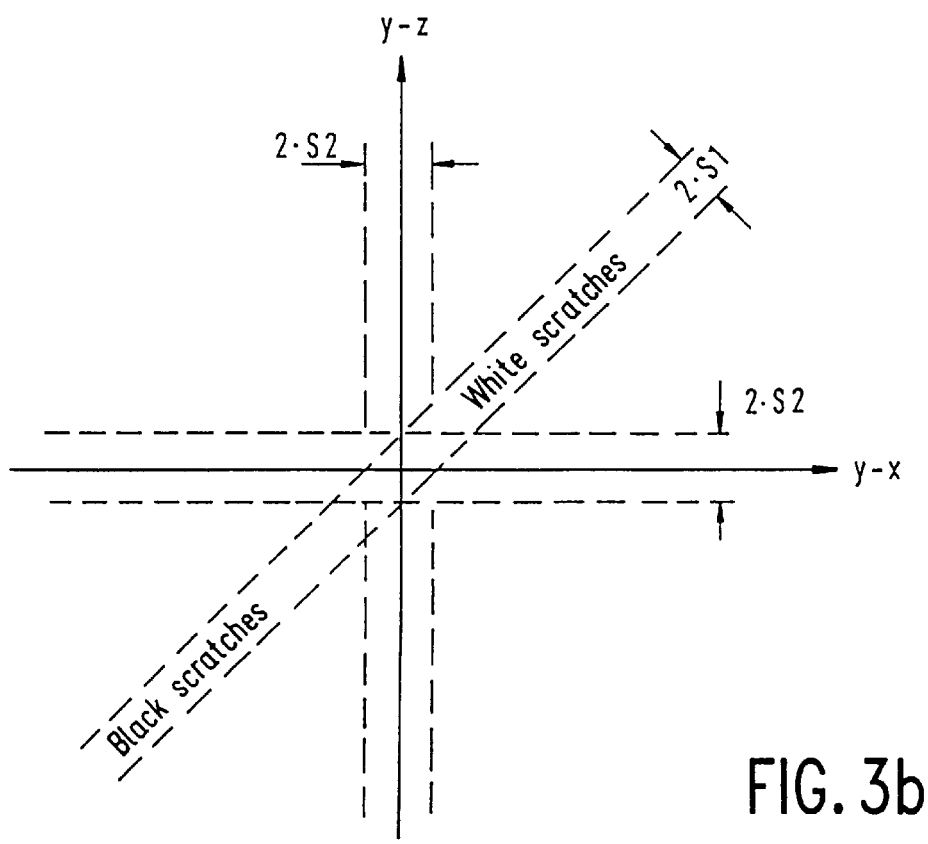

This tolerance range is shown in FIG. 3b. White scratches are located in the first quadrant of the coordinate system, whereas black scratches are located in the third quadrant. The distinguishing feature may, for example, be the sign of the difference y−x. In the environment of the origin of the coordinates, the tolerance field defined by S1 does not provide a sharp criterion for interferences, as here, all the stationary or slightly mobile picture areas, respectively, are shown. For this reason, a second condition is added, namely, both differential signals y−x and y−z must have a value greater than S2. Graphically, this means that a noise signal must have a given lowest contrast S2, to be recognizable as such.

Figure 4A:
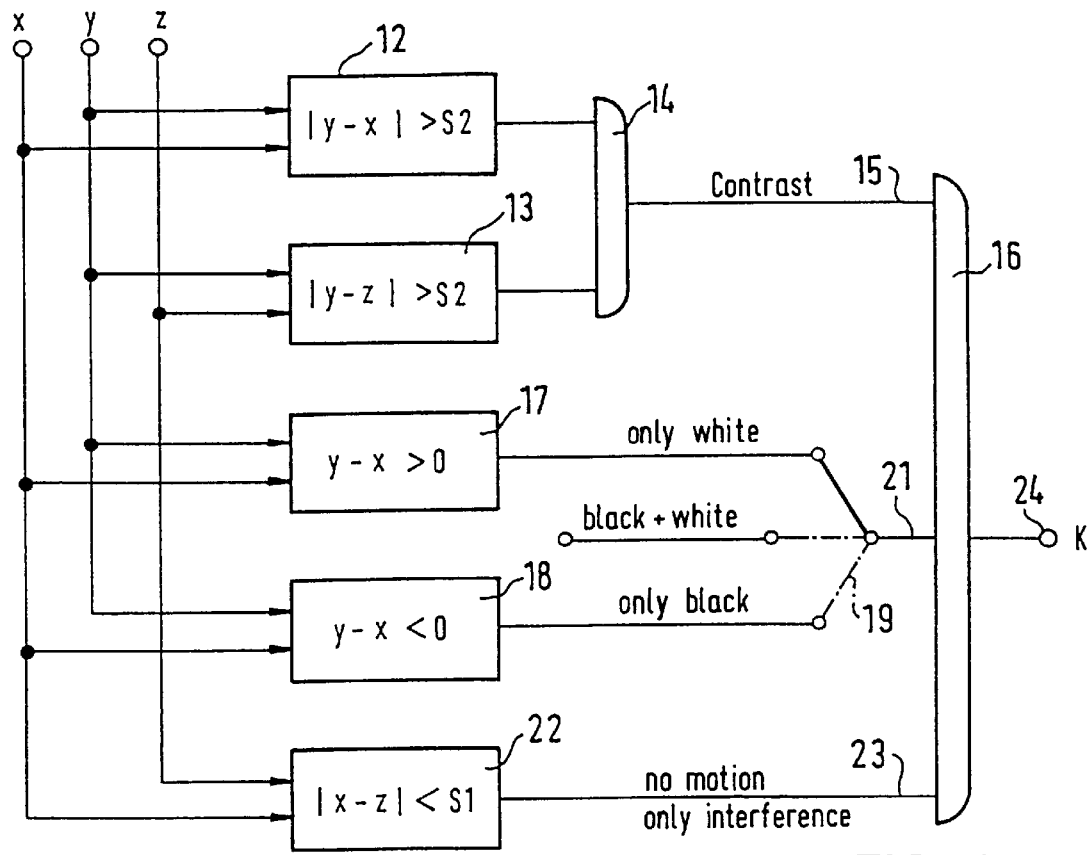
FIGS. 4a and 4b are block circuit diagrams of two alternative arithmetic-logic units.

FIG. 4a shows a circuit for an arithmetic-logic unit for deriving the control signal K. The following three conditions can therefore be formulated:

1. Contrast condition wherein |y−x|>S2 and |y−z|>S2,
2. Detection of white or black noise wherein y−x>0 or y−x<0,
3. Difference between noise and motion wherein
   (a) |x−z|<S1 means noise, no motion (consequently the control signal K is delivered),
   (b) |x−z|>S1 means no noise, but motion.

The median value of the video signals is only then switched to the output 11 by means of the control signal K when the conditions 1, 2 and 3(a) are satisfied.

The circuit of the arithmetic-logic unit 4 therefore consists of a first and a second comparator circuit 12 and 13, whose inputs are connected to the input and to the output of the first picture store 2 and to the input and to the output of the second picture store 3, respectively. In this situation, according to the differential value and absolute value formation of the input signals applied, a comparison to the threshold value S2 takes place, a signal then being supplied only when this threshold value S2 is exceeded. The outputs of the comparator circuits 12 and 13 are connected to the inputs of an AND-circuit 14, whose output is connected to the first input 15 of a further AND-circuit 16.

A third and a fourth comparator circuit 17 and 18 are connected to the input and to the output of the first picture store 2. In the comparator circuits 17 and 18 a differential signal y−x is formed, the comparator circuit 17 then supplying a signal when the differential value exceeds zero and the comparator circuit 18 then supplying a signal when the differential value is less than zero. These so-called identification signals "white" or "black", respectively, are supplied in the event of white or black scratches, respectively. In the case of a black or a white scratch, a logic "one" is formed at one of the inputs of a change-over switch 19. This change-over switch 19 then transfers the signal corresponding to the interference to the second input 21 of the further AND-circuit 16.

A fifth comparator circuit 22 is connected to the input of the first picture store 2 and to the output of the second picture store 3, respectively, a comparison to the threshold value S1 being effected after the differential value and the absolute value of the signals x and z have been formed. In this situation, a signal is only supplied when the absolute value is less than this threshold value S1. The output of this fifth comparator circuit 22 is connected to the third input 23 of the further AND-circuit 16. A control signal K can only be taken from the output 24 of this AND-circuit 16 when a logic "one" is present at each of the three inputs 15, 21 and 23.

Figure 4B:
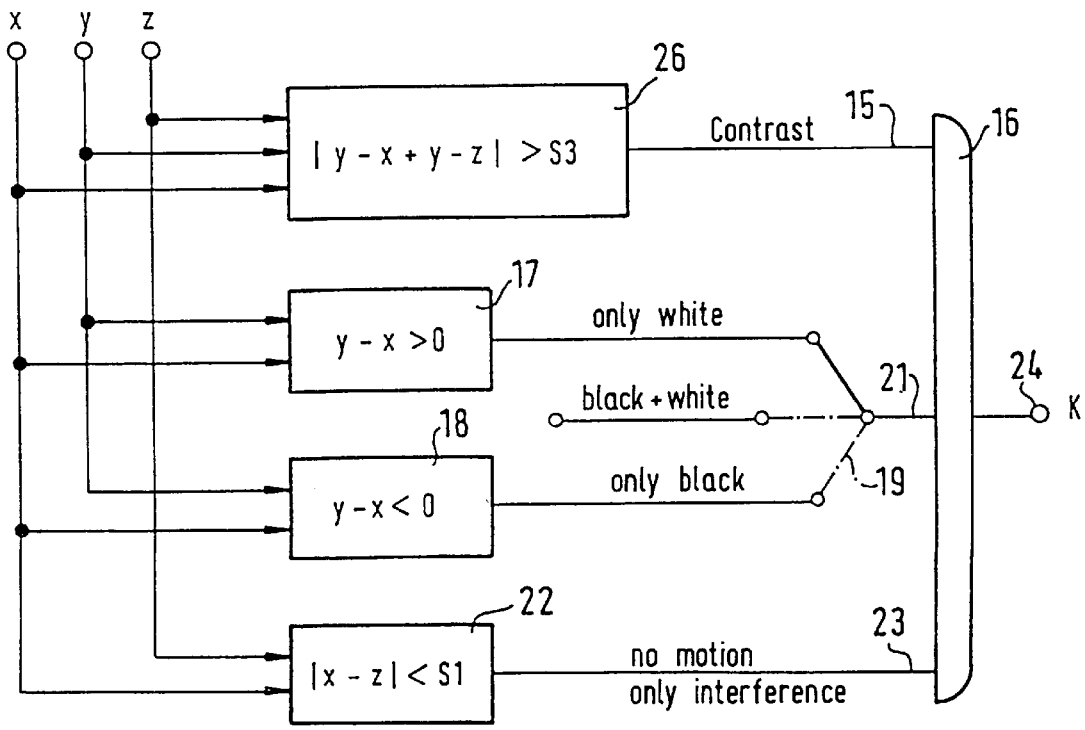

FIG. 4b shows a circuit of the arithmetic-logic unit 4 with an alternative contrast condition: |y−x+y−z|>S3, instead of the first contrast condition in accordance with FIG. 4a. Instead of the comparator circuits 12 and 13, a comparator circuit 26 is used in FIG. 4b, whose inputs are connected to the inputs of the first picture store 2 and of the second picture store 3, as well as to the output of the second picture store 3, for which reference is also made to the corresponding time diagram in FIG. 2.

Figure 5A:
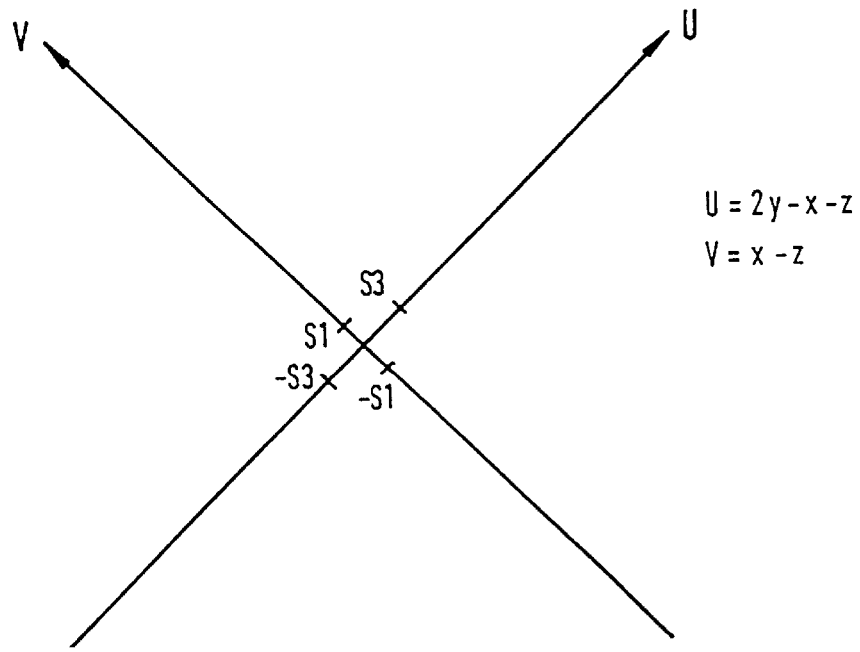
FIGS. 5a and 5b are graphic representations of picture interferences in a further system of coordinates.
Figure 5B:
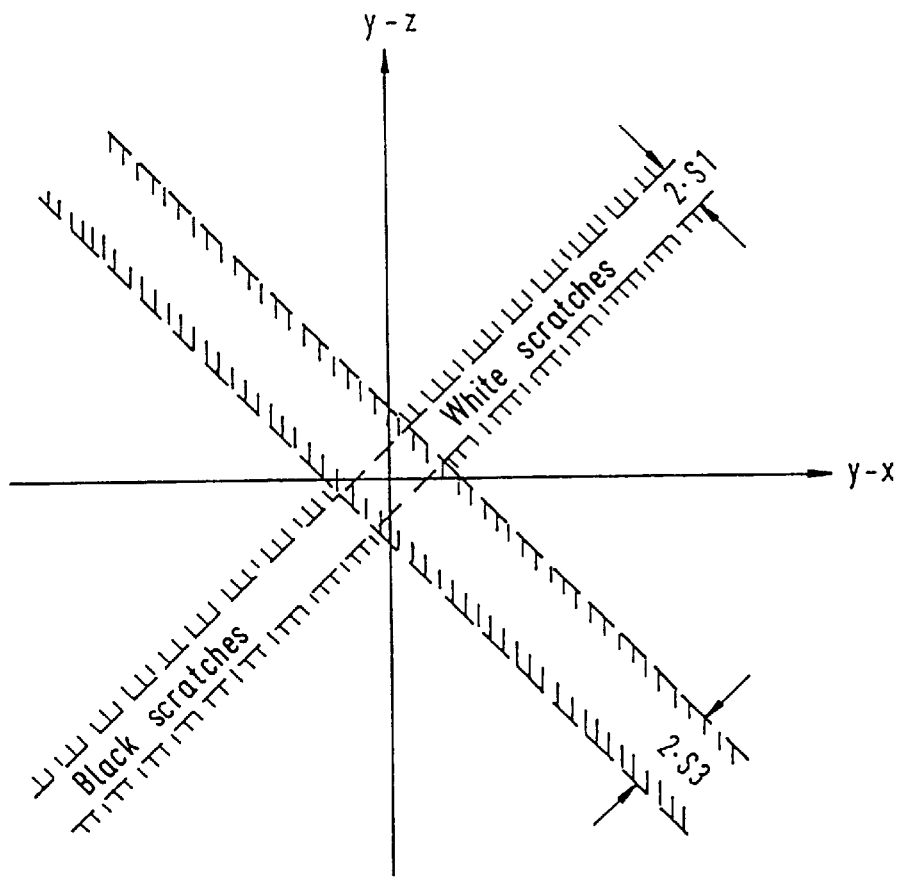

The FIGS. 5a and 5b are a graphical interpretation thereof. The threshold values S1 and S3 define tolerance fields which are located in a system of coordinates U, V which are rotated through 45° and extend parallel to the axis. For the rotated coordinates, the following transformation equations apply: U=2y−x−z and V=x−z.

Figure 2:
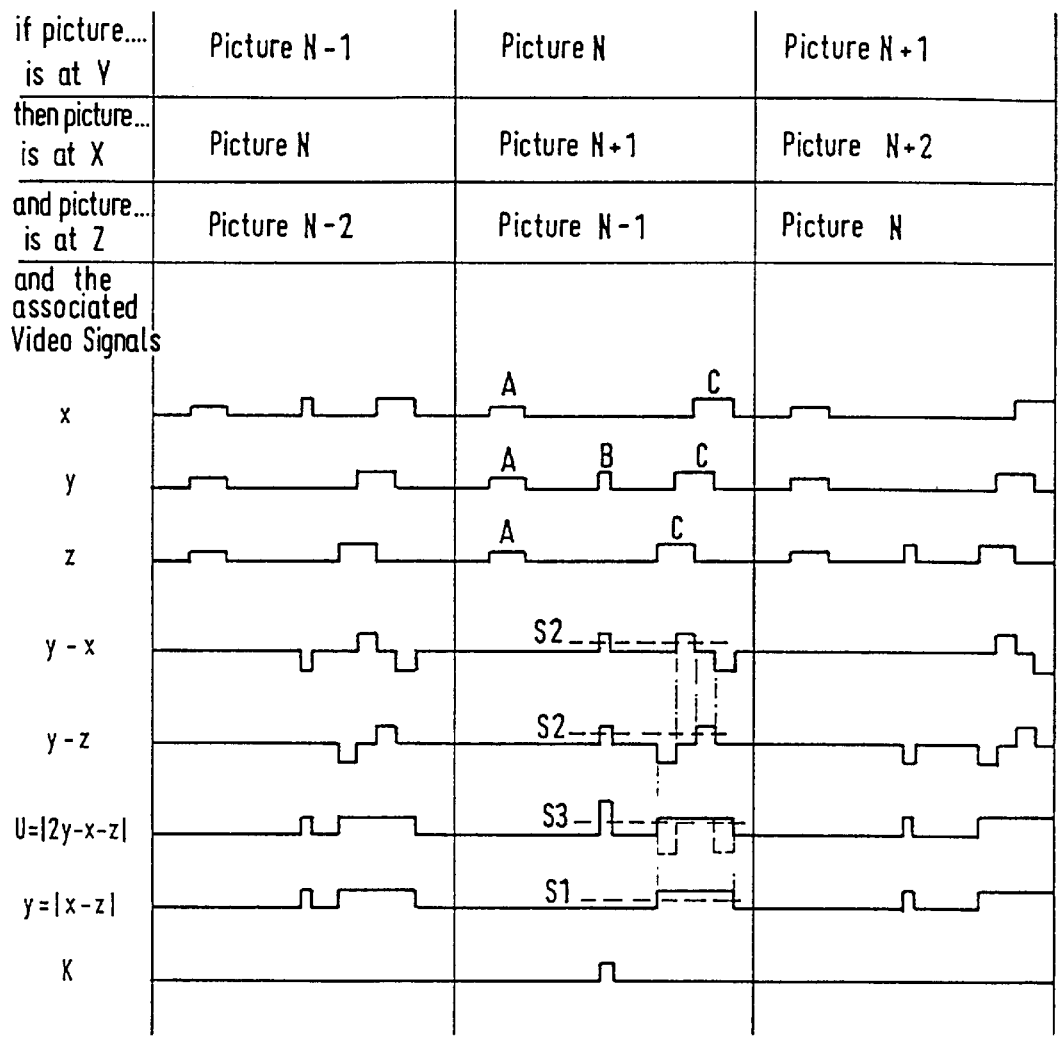
FIG. 2 shows a time diagram for deriving control signals.

The circuit of FIG. 4b has the advantage that using the contrast condition |2y−x−z|>S3 or |U|>S3, respectively, the interference (object B) versus the motion (object C) is eliminated to a greater extent, as can be seen from the time diagram shown in FIG. 2. It is also easy to see from this time diagram that the control signal K only changes to logic "one" in the case when it holds that:

S1 is not exceeded, consequently no motion, and
S2 is exceeded (contrast condition), or
S3 is exceeded (alternative contrast condition), respectively.

Figure 6:
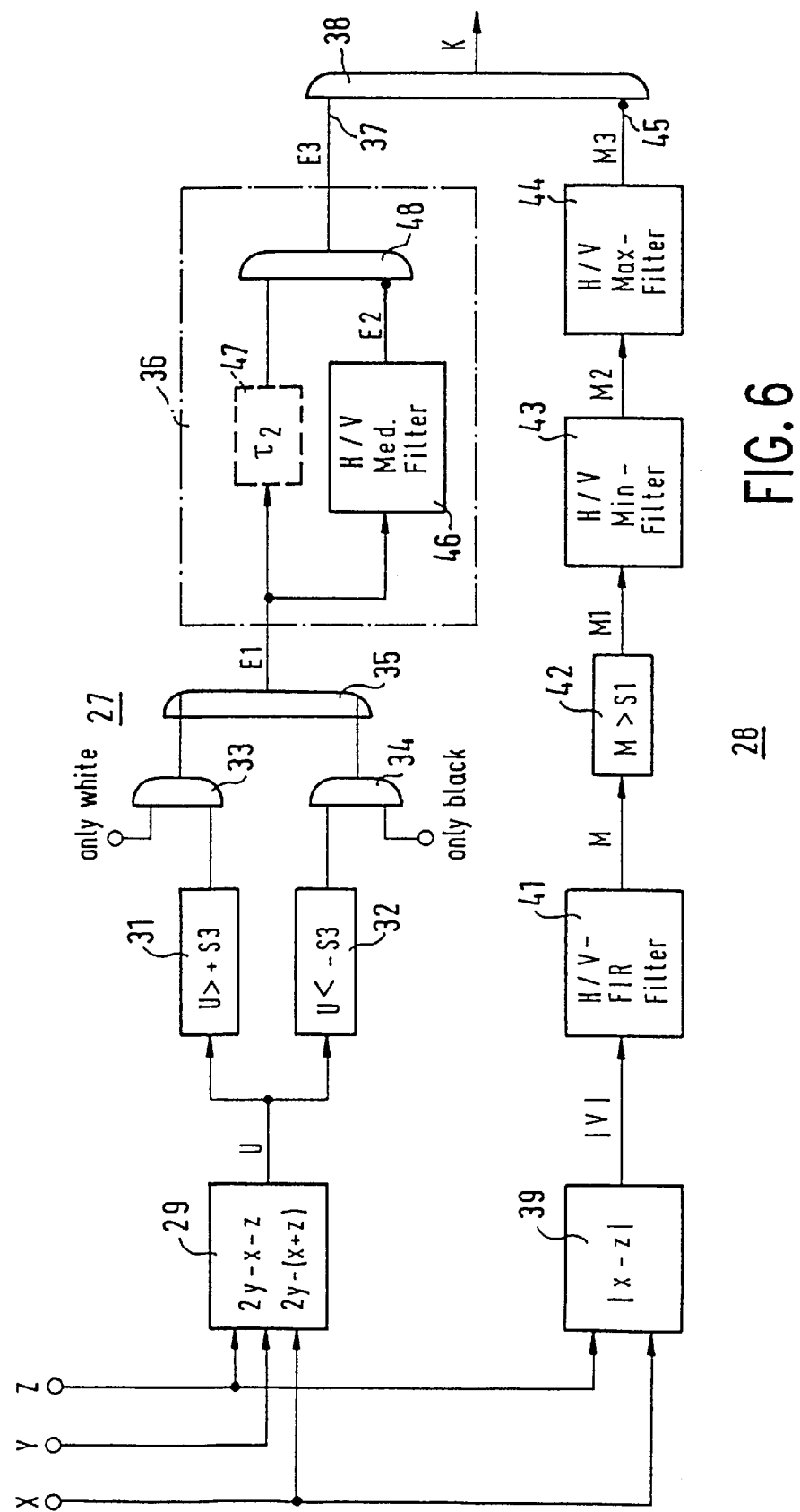
FIG. 6 is a block circuit diagram of a further arithmetic-logic unit.

FIG. 6 shows an improved circuit for producing the control signal K, which is based on the principle of the circuit shown in FIG. 4b, i.e., the signal processing is effected in the rotated U/V-system of coordinates. This has the advantage that the U-signal basically contains the noise signal components, while, in the V-signal, basically the motion components are contained. An additional dual-channel signal processing for U and V has for its aim to separate the components noise and motion to a still better extent from each other and to remove unwanted noise components from them.

During processing of the U-signal in the upper signal channel 27, there is first provided a circuit 29 for forming the differential value, whose inputs are connected to the inputs and outputs x, y, z, respectively, of the picture stores 2, 3, whereafter, after the differential values between the output and input signals y−x of the first picture store 2, and between the input and output signals y−z of the second picture store 3 have been formed, the differential values are added together. The output of this circuit 29 is connected to each of the inputs of two comparator circuits 31, 32, in which a comparison of the output signal U of the circuit 29 for forming the differential value to the positive value or the negative value, respectively, of the threshold value S3 is performed, and a signal is supplied only when the signal U exceeds the positive or less than the negative value, respectively, of the threshold value S3, respectively.

The outputs of the comparator circuits 31, 32 are each connected to an input of two AND-circuits 33, 34, which serve as gate circuits. To that end, a control signal "only white" or "only black", respectively, is always applied to the second inputs of the AND-circuits 33, 34. If both black and white scratches are detected, both control signals have logic value "one". The outputs of the AND-circuits 33, 34 are each connected to an input of an OR-circuit 35, whose output is connected via a pulse-width discriminator 36 to the first input 37 of a further AND-circuit 38.

For processing the V-signal in the lower channel 28, there is first provided a circuit 39 for forming the differential value and the absolute value, whose inputs are connected to the input of the first picture store 2 and to the output of the second picture store 3. Consequently, the difference between the signal x and the signal z is formed in the circuit 39 and thereafter its absolute value, so that a signal |V| can be taken from the output of the circuit 39. The |V|-signal is applied, via a subsequent H/V-transversal filter 41, which acts as a low-pass filter, as signal M to a comparator circuit 42, wherein a comparison to the threshold value S1 is effected and a signal M1 is supplied only when this threshold value is exceeded. The output signal M1 is applied, via a H/V-min-filter 43, for the purpose of signal expansion, and a H/V-max-filter 44, for the purpose of signal narrowing, to the inverting input 45 of the AND-circuit 38, from whose output the control signal K can be taken.

As has already been mentioned in the foregoing, the interferences are mapped in the ideal case on the straight line x=z, i.e., V=x−z=0 is located on the U-axis. Because of noise superimposed thereon, the V-component is not accurately equal to zero, for which reason the tolerance field having a width 2 S1 had to be inserted. By a bi-dimensional low-pass filtering of the V-components in the horizontal and the vertical direction by means of the filter 41, it is possible to decrease the required threshold value S1 to a significant extent, so as to obtain thereby an improved selectivity for the noise components. For this purpose it is absolutely sufficient to simply form a mean value over approximately three lines and seven picture elements.

Contrary to the circuit shown in FIG. 4b, the subsequent comparator circuit 42 checks whether the filtered signal |x−z| is higher than the adjusted threshold value S1. If so, then accordingly, there is no interference, only motion. The preceding low-pass filtration has the side effect that the motion signal is expanded. The advantage this provides will be explained with reference to the time diagrams of FIG. 7.

FIG. 7 once again shows the three objects A (quiescent picture content), B (disturbed picture content) and C (mobile picture content). In contradistinction to FIG. 2, the object C now moves very rapidly. This has for its consequence that the motion signal |x−z| has a gap in its center. Without further measures, the fast-moving object C would erroneously be interpreted as being an interference and would consequently be filtered out. By expanding the motion signal with the aid of the low-pass filter 41, the gap is already reduced to some extent, as can be seen from signal M1. It is therefore obvious to expand the motion signal M1 still further. This is accomplished by the H/V-min-filter 43. The H/V-min-filter 43 projects from a bi-dimensional window, formed by a series of picture elements and lines, its minimum input value at the output. Since the input signal M1 only consists of one bit, the min-function represents a simple OR-operation on the values of the filter window. The size of the window depends on the maximum motional speed of the mobile objects or on the maximum shift from one picture to the next but one picture.

On film reproduction, this value is twice as high as with video signals, because of the low picture recording frequency of 24 frames/s. In practical tests, a filter window of approximately 5 lines * 21 picture elements proved to be sufficient for film reproduction. As horizontal motion generally dominates and, for example, due to moving of the camera, occurs much more often, this explains the comparatively small vertical filtering over only 5 lines.

In the processing of video signals, the filter window may be reduced to 3 lines * 11 picture elements. It is, however, a condition that simultaneously, the picture delay members 2, 3 for the generation of three video signals x, y, z are switched over from frame delay to field delay.

Figure 7:
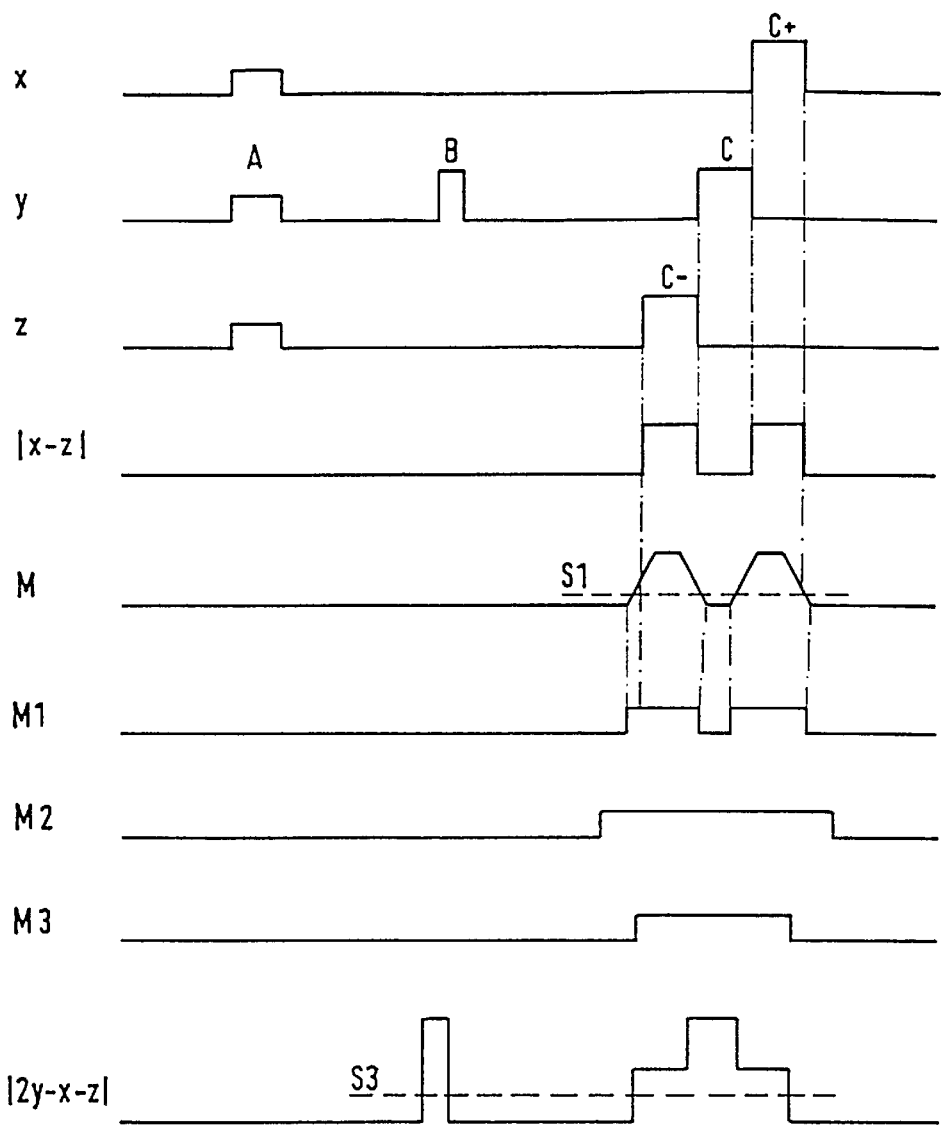
FIG. 7 shows a time diagram of the signals shown in FIG. 6.

FIG. 7 shows, at the signal M2, how in this manner the gap in the motion signal is closed. It shows, at any rate, also the significant widening of the motion signal, which extends far outside the range of the object C. This unwanted signal expansion is eliminated by the subsequent H/V-max-filter 44, but the gap remains closed. The H/V-max-filter 44 represents a logic AND-operation on the input signal via a bi-dimensional field. The filter window can be chosen slightly greater compared with the preceding min-filtering, to also contribute to compensating for the expansion of the motion signal by the low-pass filter 41. The motion signal M3 thus obtained is used with the opposite polarity as an enable signal for the upper signal channel 27.

When the arithmetic-logic unit described in FIG. 6 is used, disturbed picture areas of any optional size can be replaced. In the extreme case, a single black picture in a sequence of white pictures can be completely suppressed. This is, however, not necessary in actual practice. The interferences rather extend over a limited number of associated picture elements and, depending on the cause, have each a given local effect. This may be purely in the horizontal direction (drop-out of picture elements, high-frequency pulses, clamping interferences) or only in the vertical direction (film-run scratches) but may also be planar (film dust, film dirt). It is therefore good policy to limit the noise signal E1 to the anticipated size, using the pulse-width discriminator 36 shown in FIG. 6. Thus, it can furthermore be prevented that a very rapidly moving object C effects over a large area an inadvertent triggering of the control signal K, cf. the signal |2y−x−z| in FIG. 7.

Figure 8:
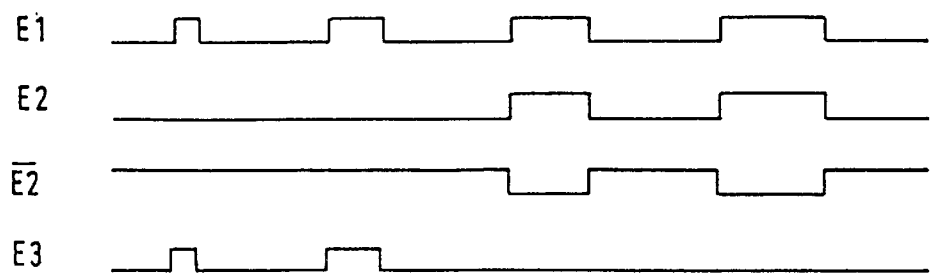
FIG. 8 shows a time diagram of the signals present in the pulse width-discriminator of FIG. 6.

FIG. 8 illustrates, on the basis of a time diagram, the principle of such a suppression circuit (for the sake of simplicity only in the horizontal direction). A median filter 46 acts in the example over 5 picture elements. That is to say, it supplies from its output a signal only when, at the input, more than half the number of picture elements, consequently at least 3 picture elements, have logic "one" value. The signal sequence E2 may be interpreted as a low-pass filtered version of the input signal E1, as only the low frequency (wide) pulses are transferred by the median filter. In order to obtain a high-pass filtered version of the input signal sequence, in which the wide pulses are suppressed, the output signal E2 of the median filter 46 must be subtracted from the input signal E1. Since the signals E1 and E2 are binary signals, the subtraction can be represented by means of an AND-operation E1 & !E2 which can be performed by an AND-circuit 48.

So as to realize the bi-dimensional discriminator 36, the filter window of the median filter 46 must be adjustable to a maximum size of 9 lines * 21 picture elements, in order to suppress the most significant interferences which may be anticipated in actual practice. A further four completely disturbed lines can, for example, be restored therewith, or perpendicularly extending interferences up to 10 picture elements wide or planar interferences which extend over a total of 94 picture elements. For less serious interferences, the filter window can be reduced stepwise, for example, to 7 lines * 15 picture elements, 5 lines * 11 picture elements or 3 lines * 7 picture elements. Also, other combinations can be suitable, for example, 5 lines * 1 picture element, when the input signal has horizontal clamping interferences of a width of two lines. For the case in which extremely large-sized picture interferences are yet to be processed, it must be possible to switch the pulse-width discriminator 36 completely off, it then holding that E3=E1. For the AND-operation of the signals E1 and E2, a delay time matching T2, corresponding to the transit time delay of the median filter 46, is required, for which the delay member 47 is provided. Likewise the signals E3 and M3 for generating the control signal K must have equal transit times.

I claim:

1. A method of removing noise signals from video signals by means of adaptive median filtering, characterized in that the method comprises the steps:

classifying a picture content of the video signals in stationary, moving, undisturbed and disturbed picture areas; and performing error masking by means of temporal median filtering only in the disturbed and stationary picture areas.

2. A method as claimed in claim 1, characterized in that said method further comprises the steps:

deriving a control signal (K) from simultaneously available video signals of at least three time-sequential pictures; and selectively conveying, with said control signal (K), either the video signals which are derived by temporal median filtering the disturbed and stationary picture areas or the video signals which are derived from the undisturbed and the moving picture areas and which are not filtered.

3. A method as claimed in claim 2, characterized in that the control signal (K) is a switching signal for switching between the median-filtered and the unfiltered video signals.

4. A method as claimed in claim 2, characterized in that for deriving the control signal (K), the following conditions must simultaneously be satisfied: $|y-x|>S2$, $|y-z|>S2$, $|y-x|>0$ or $|x-y|<0$, $|x-z|<S1$, wherein x, y, z indicate the video signals derived from the three pictures, S1 and S2 each indicating an adjustable threshold value.

5. A method as claimed in claim 2, characterized in that for deriving the control signal (K), the following conditions must simultaneously be satisfied: $u=|2y-x-z|>S3$, $v=|x-z|<S1$, wherein x, y, z indicate the video signals derived from the three pictures, S3 and S1 each indicating an adjustable threshold value.

6. A circuit for removing noise signals from video signals by means of adaptive median filtering, characterized in that said circuit comprises:

at least two serially-arranged picture stores, said video signals being applied to an input of a first of said picture stores and picture-sequentially delayed video signals being supplied at outputs of said picture stores;

an arithmetic-logic unit having inputs coupled, respectively, to the input of said first picture store and to the outputs of the picture stores;

a median filter having inputs coupled, respectively, to the input of said first picture store and to the outputs of the picture stores; and a change-over switch having a first input coupled to an output of the median filter, and a second input coupled to the output of the first picture store, an output of the arithmetic-logic unit, from which a control signal is supplied, being connected to a control input of the change-over switch.

7. A circuit as claimed in claim 6, characterized in that the arithmetic-logic unit comprises:

a first and a second comparator circuit having inputs connected to the input and to the output of the first picture store and to the input and the output of a second of said picture stores, respectively;

means for forming a first and a second absolute value of outputs from said first and second comparison circuits;

first means for comparing said first and second absolute values to a first threshold value and for supplying a signal only when the first threshold value is exceeded;

an AND-circuit having inputs coupled, respectively, to outputs of said first comparing means;

a further AND-circuit having an input coupled to an output of said AND-circuit;

a third and a fourth comparator circuit having inputs connected to the input and to the output of the first picture store both for forming a differential value between the output and the input of the first picture store;

means, coupled to outputs of said third and fourth comparator circuits, for forming an identification signal "WHITE" when said differential value is greater than zero, or for forming an identification signal "BLACK" when said differential value is less than zero, an output of said identification signal forming means being applied to a second input of the further AND-circuit;

a fifth comparator circuit having inputs connected to the input of the first picture store and to the output of the second picture store;

means for forming a third absolute value of an output of said fifth comparator circuit; and second means for comparing said third absolute value to a second threshold value, said second comparing means supplying a signal only when said third absolute value is less than the second threshold value, an output of the second comparing means carrying the signal being connected to a third input of the further AND-circuit, whereby said control signal is provided at an output of the further AND-circuit when a signal is present at each one of three inputs of the further AND-circuit.

8. A circuit as claimed in claim 6, characterized in that the arithmetic-logic unit comprises:

a first comparator circuit having inputs connected to the inputs and outputs, respectively, of the picture stores, said first comparator circuit forming a first differential value between the output and the input of the first picture store and a second differential value between the input and the output of a second of said picture stores, and adding the first and second differential values together thereby forming a sum value;

means for forming a first absolute value of the sum value;

first means for comparing said first absolute value to a first threshold value, said first comparing means supplying a signal only when the first threshold value is exceeded;

an AND-circuit having a first input connected to an output of the first comparing means;

a second and a third comparator circuit having inputs connected to the input and to the output of the first picture store, said second and third comparator circuits both forming a differential value between the output and the input of the first picture store;

means coupled to said second and third comparator circuits for supplying an identification signal "WHITE" when said differential value is greater than zero, and for supplying an identification signal "BLACK" when said differential value is less than zero, respectively, an output of said supplying means being coupled to the second input of the AND-circuit;

a fourth comparator circuit having inputs connected to the input of the first picture store and to the output of the second picture store, said fourth comparator circuit forming a differential value between the input of the first picture store and the output of the second picture store;

means for forming a second absolute value of said differential value formed by said fourth comparator circuit; and second means for comparing said second absolute value to a second threshold value, said second comparing means supplying a signal only when said second absolute value is less than said second threshold value, an output of said second comparing means being connected to a third input of the AND-circuit, whereby said control signal is supplied at an output of said AND-circuit when a signal is present at each one of said first, second and third inputs of said AND-circuit.

9. A circuit as claimed in claim 6, characterized in that the arithmetic-logic unit comprises:

a first circuit for forming a first differential value having inputs connected to the inputs and outputs, respectively, or the picture stores, said first circuit for forming said first differential value forming a first intermediate differential value between the output and the input of the first picture store, and a second intermediate differential value between the input and the output signal of a second of said picture stores, said first and second intermediate differential values being added together forming the first differential value;

two comparator circuits each having an input coupled to an output of said first circuit for forming said first differential value, said two comparator circuits-comparing the first differential value to a positive version and a negative version, respectively, of a first threshold value, said two comparator circuits supplying a signal only when the first differential value exceeds the positive version or is less than the negative version of the first threshold value is exceeded or fallen short of, respectively;

two AND-circuits having first inputs coupled to outputs of said two comparator circuits, respectively, and second inputs for receiving signals corresponding to a white value and a black value, respectively;

an OR-circuit having inputs connected to outputs of said two AND-circuits;

a pulse width discriminator having an input connected to an output of said OR-circuit;

a further AND-circuit having a first input connected to an output of said pulse width discriminator;

a second circuit for forming a second differential value having inputs connected to the input of the first picture store and to the output of a second of said picture stores;

means for forming an absolute value from said second differential value;

a low-pass filter having an input coupled to an output of said absolute value forming means;

a comparator circuit having an input coupled to an output of said low-pass filter, said comparator circuit comparing an output signal from said low-pass filter to a second threshold value and supplying a signal only when the second threshold value is exceeded;

a H/V-min-filter having an input connected to an output of said comparator circuit; and a H/V-max-filter having an input connected to an output of said H/V-min-filter, an output of said H/V-max-filter being connected to an inverting second input of the further AND-circuit, the control signal being supplied at an output of the further AND-circuit.

10. A circuit as claimed in claim 9, characterized in that the pulse width discriminator comprises:

means for adapting a propagation time of a signal applied to the input of said pulse width discriminator;

an AND-circuit having a first input coupled to an output of said adapting means; and a H/V-median filter having an input also connected to the input of the pulse width discriminator, and an output connected to an inverting second input of the AND-circuit, an output of the AND-circuit forming the output of the pulse width discriminator.

* * * * *